United States Patent
Acres

(10) Patent No.: US 8,834,248 B2
(45) Date of Patent: Sep. 16, 2014

(54) SYSTEM FOR PROCESSING GAMING ACTIVITY

(75) Inventor: John F. Acres, Corvallis, OR (US)

(73) Assignee: Patent Investment & Licensing Company, Las Vegas, NV (US)

( * ) Notice: Subject to any disclaimer, the term of this patent is extended or adjusted under 35 U.S.C. 154(b) by 86 days.

(21) Appl. No.: 13/452,435

(22) Filed: Apr. 20, 2012

(65) Prior Publication Data

US 2012/0202590 A1 Aug. 9, 2012

Related U.S. Application Data

(63) Continuation of application No. 12/273,421, filed on Nov. 18, 2008, now Pat. No. 8,177,647.

(51) Int. Cl.
*A63F 9/00* (2006.01)
*A63F 13/00* (2014.01)
*G06F 17/00* (2006.01)
*G06F 19/00* (2011.01)

(52) U.S. Cl.
USPC .......................................................... 463/16

(58) Field of Classification Search
USPC .................................................... 463/16, 17
See application file for complete search history.

(56) References Cited

U.S. PATENT DOCUMENTS

| | | | |
|---|---|---|---|
| 6,003,013 A | 12/1999 | Boushy et al. | |
| 6,390,917 B1 | 5/2002 | Walker et al. | |
| 6,508,710 B1 | 1/2003 | Paravia et al. | |
| 6,645,068 B1 | 11/2003 | Kelly et al. | |
| 7,384,338 B2 | 6/2008 | Rothschild et al. | |
| 7,406,516 B2 | 7/2008 | Davis et al. | |
| 7,500,916 B2 | 3/2009 | Liberman et al. | |
| 2002/0147049 A1 | 10/2002 | Carter, Sr. | |
| 2002/0177480 A1 | 11/2002 | Rowe | |
| 2003/0003988 A1* | 1/2003 | Walker et al. | 463/21 |
| 2004/0002369 A1* | 1/2004 | Walker et al. | 463/1 |
| 2004/0248642 A1 | 12/2004 | Rothschild | |
| 2005/0043086 A1* | 2/2005 | Schneider | 463/25 |
| 2005/0148377 A1 | 7/2005 | Goldberg et al. | |
| 2006/0040730 A1 | 2/2006 | Walker et al. | |
| 2007/0087818 A1 | 4/2007 | Walker et al. | |
| 2008/0045317 A1 | 2/2008 | Seelig et al. | |

(Continued)

FOREIGN PATENT DOCUMENTS

| | | |
|---|---|---|
| CA | 2 613 335 | 1/2007 |
| CA | 2 613 335 A1 | 1/2007 |
| WO | WO 2004/046859 A2 | 6/2004 |

*Primary Examiner* — Omkar Deodhar
*Assistant Examiner* — Reginald Renwick
(74) *Attorney, Agent, or Firm* — Marger Johnson & McCollom PC

(57) ABSTRACT

Embodiments of the present invention are directed to a gaming device configured to record gaming activity, a method of processing the recorded gaming activity to analyze player behavior, and a system including the gaming device. The gaming device may include a gaming display to display gaming events played on the gaming device by a player during a gaming session, a player interface panel including a plurality of gaming buttons and a game initiating button configured to initiate the gaming events, and a game processor configured to record each activity between the player and the gaming device, wherein each recorded activity is associated with a time stamp.

12 Claims, 11 Drawing Sheets

(56) References Cited

U.S. PATENT DOCUMENTS

| | | |
|---|---|---|
| 2008/0102946 A1 | 5/2008 | Amour |
| 2008/0108433 A1 | 5/2008 | DiMichele et al. |
| 2008/0119283 A1 | 5/2008 | Baerlocher |
| 2008/0153596 A1 | 6/2008 | Nguyen |
| 2008/0227551 A1 | 9/2008 | Kelly et al. |
| 2009/0170608 A1 | 7/2009 | Herrmann et al. |
| 2010/0124960 A1 | 5/2010 | Lutnick et al. |
| 2010/0124967 A1 | 5/2010 | Lutnick et al. |

* cited by examiner

SYSTEM FOR PROCESSING GAMING ACTIVITY

RELATED APPLICATIONS

This application is a continuation of U.S. patent application Ser. No. 12/273,421, now U.S. Pat. No. 8,177,647 issued May 15, 2012 entitled SYSTEM FOR PROCESSING GAMING ACTIVITY filed Nov. 18, 2008, which is incorporated by reference.

FIELD OF THE INVENTION

This disclosure relates generally to a system used to process gaming activity, and more particularly to a system for use with a gaming device to monitor and process gaming events and player input on the gaming device.

BACKGROUND

Casinos have long found it beneficial to closely monitor the financial performance of gaming machines. During the past two decades, casinos have turned to electronic monitoring, in which a communications connection is established between each gaming machine and a central storage location or server. Game performance data is collected at regular intervals, for example, every hour, every shift, or every day, from each game and stored on the central server in an organized way. Later, another computer process examines and consolidates those records into reports. Information recorded may include, wagers made, wagers paid, games played, and even denomination of currency used to play the games.

Often times, the above described accounting system is extended to connect to various entry points of each game. For example, the entry door to a slot machine is connected to a sensor so that any door opening is immediately made known to security personnel to alert them of a potentially unauthorized entry. Other monitored entry points include the currency acceptor door and the coin collection door. This information may be used for instant security purposes and/or stored in an organized way at a central storage location or server.

In most casinos, players are issued identification cards, which may be inserted into any gaming machine during play activities. These identifiers allow the casino to measure the amount of a player's wagers and evaluate their worth. As an incentive to use the identifier card, and to establish loyalty with the casino, valuable players are offered points, free meals, comps, show tickets, cash rebates, and other rewards. Information concerning the player ID and play associated with the player is often recorded on the same server as the above-described accounting information. Alternately, it is recorded on a separate computer server but is still organized in such a way that consolidated reports may be created through analysis of the stored information.

The just-described processes provide useful security alerts and valuable information on how much players spend at each gaming machine. To implement them, each gaming machine is programmed to record the values of interest and transmit them to the central server though a specifically defined language or protocol. Both the sender of the information, the gaming machine in this case, and the receiver of information, in this case the central server, must be capable of understanding the protocol and of formatting transmitted information using the protocol.

These processes and protocols provide accurate accounting records for overall game performance. However, these processes do not help in understanding player behavior. For example, when a player decides to leave a gaming machine, do they do so when they run out of credits on the machine, hit a significant jackpot, or go for a long period of time without hitting a significant jackpot? Do players typically wager maximum credits for long periods and drop to lesser wagers when credits run low, or do they typically change wager sizes throughout a gambling session?

What is needed to answer these questions and others is a way to determine player behavior on a gaming machine. Traditionally, player behavior is estimated through analysis of the above-described data and through direct observation of players as they play the gaming machines. The currently collected information simply does not provide the detailed insights necessary to truly understand behavior and direct observation of players is difficult. This is because players do not like to be watched. Also, it is expensive to station a person to watch each player and even when that is done, it is difficult for the observer to note and record each action taken by the player. Thus, a means for automatically recording detailed player behavior and a process for analyzing that behavior in a rapid and cost-effective way are needed.

DETAILED DESCRIPTION

Figure 1A:
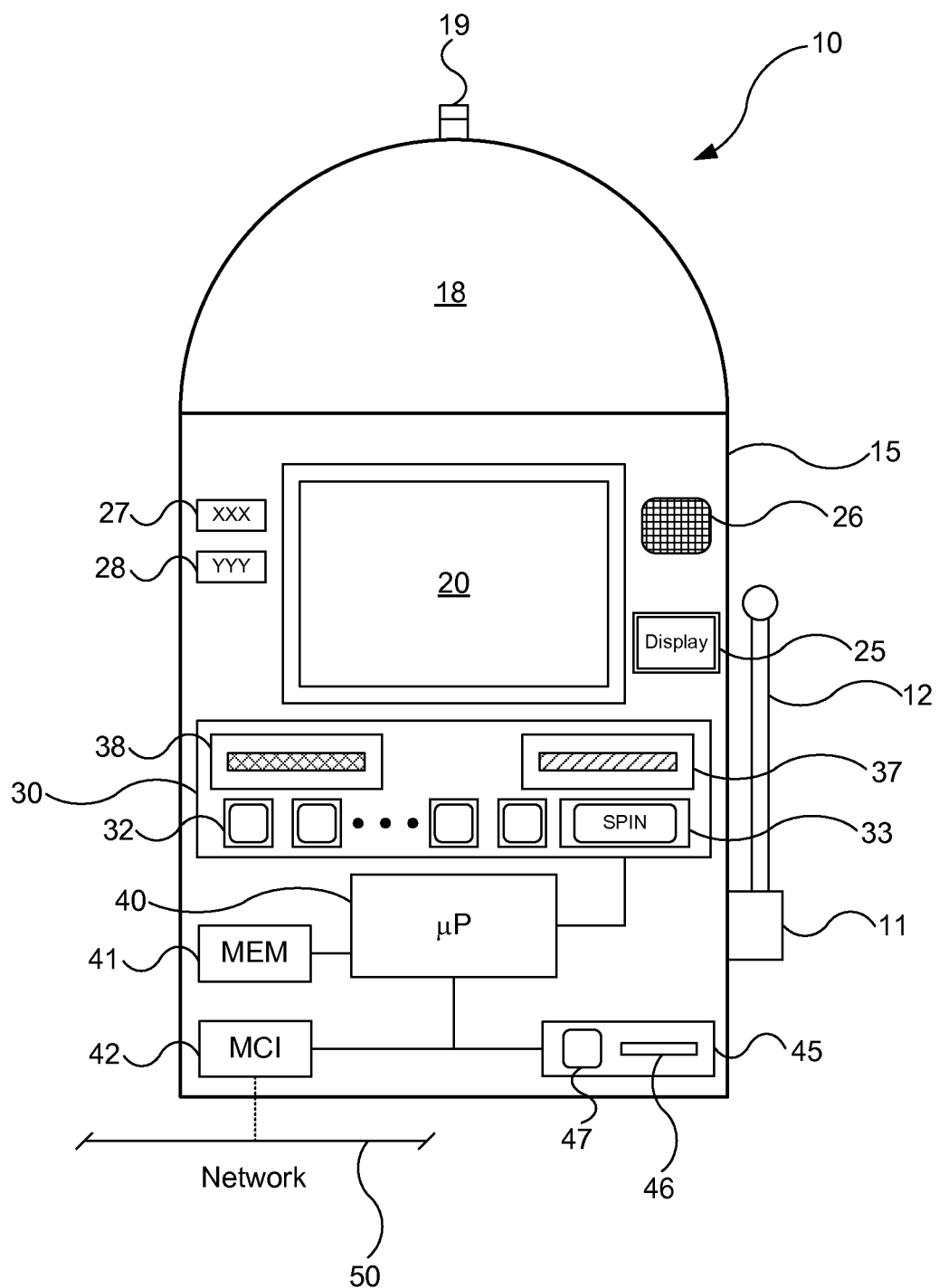
FIG. 1A is a functional block diagram that illustrates a gaming device according to embodiments of the invention.
Figure 1B:
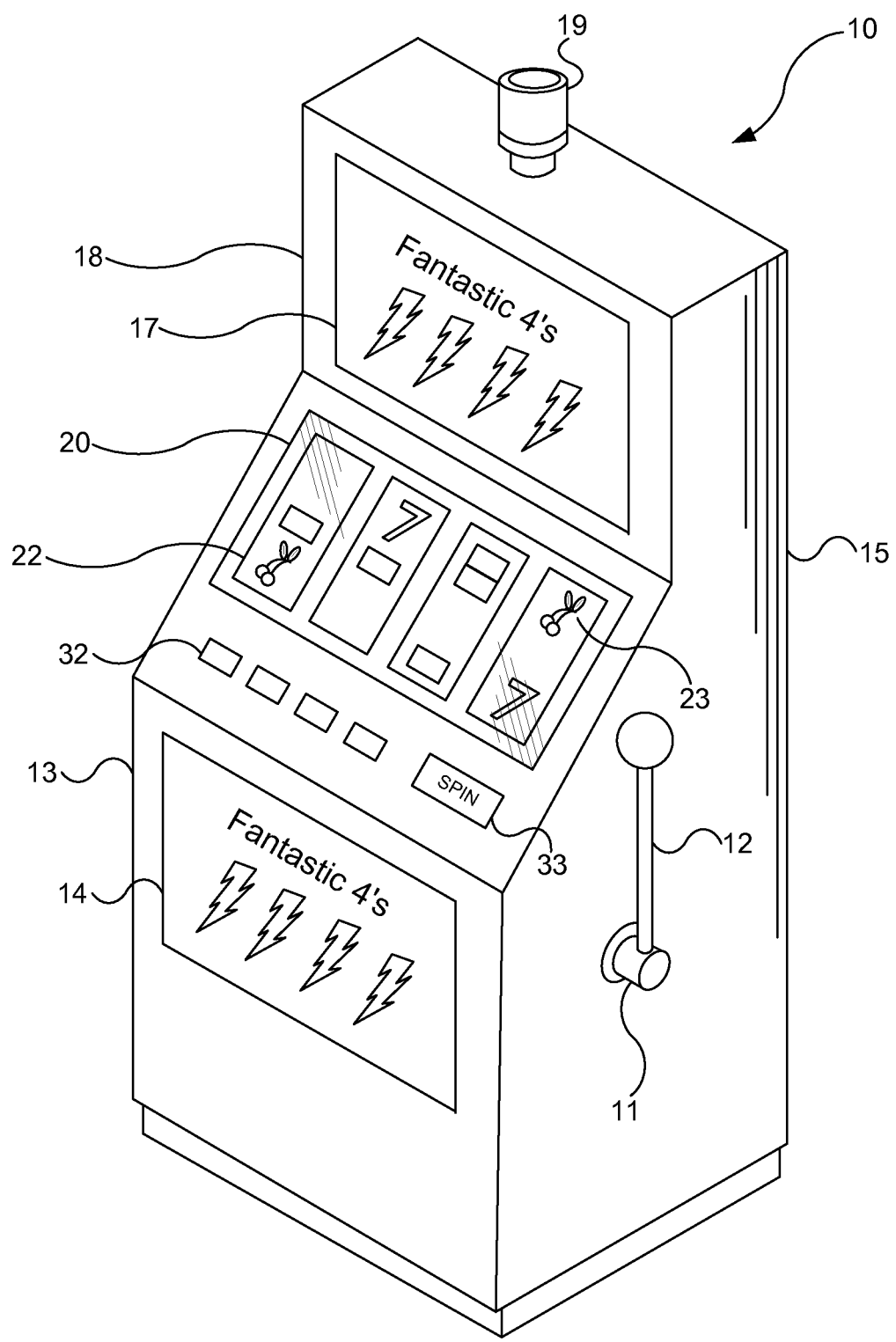
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cashout.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). One of skill in the art will readily see that this invention is useful with all gambling devices, regardless of the manner in which wager value-input is accomplished.

The credit meter 27 displays the numeric credit value of the money inserted dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
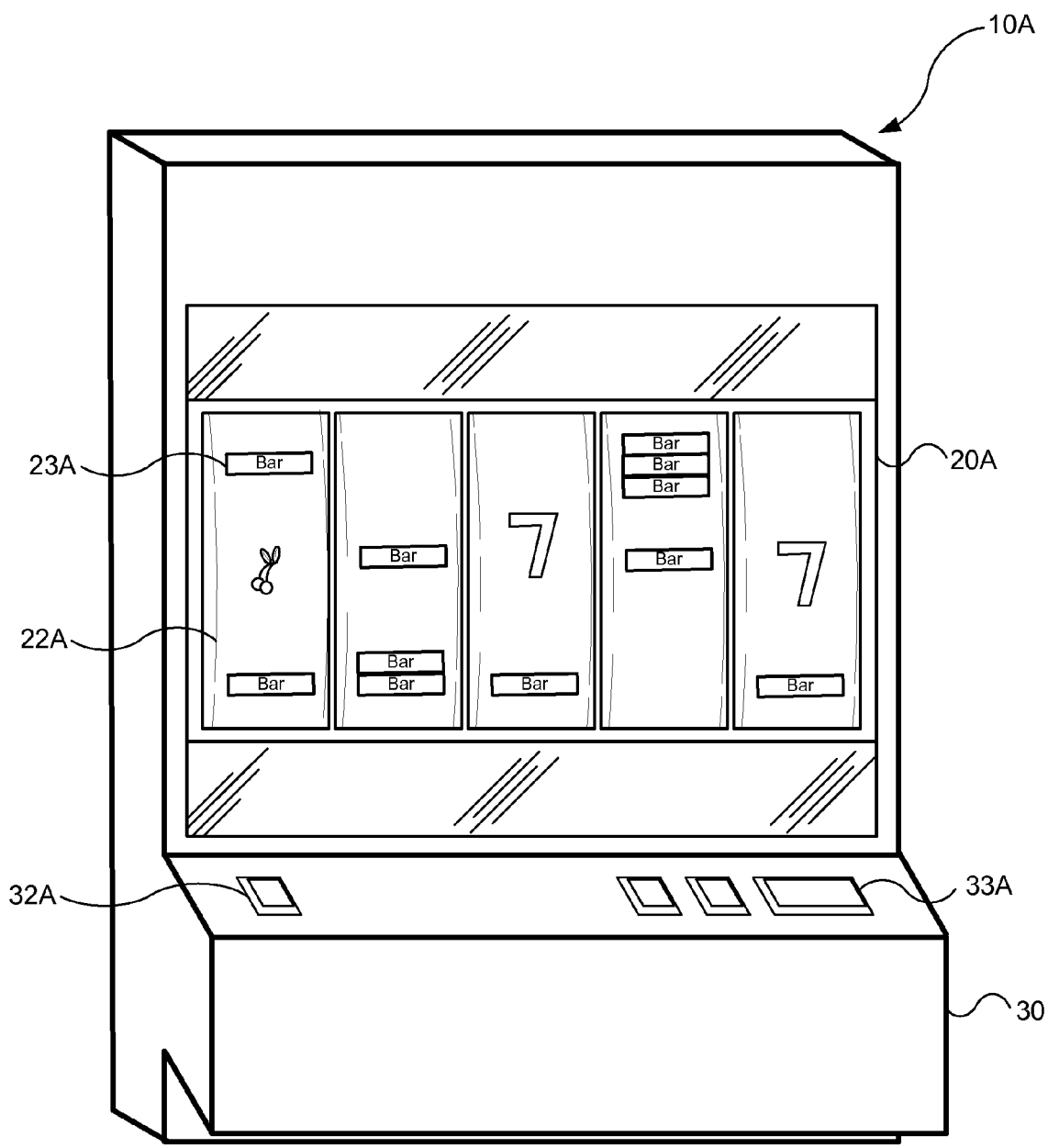
FIGS. 2A, 2B, and 2C are detail diagrams of exemplary types of gaming devices according to embodiments of the invention.
Figure 2B:
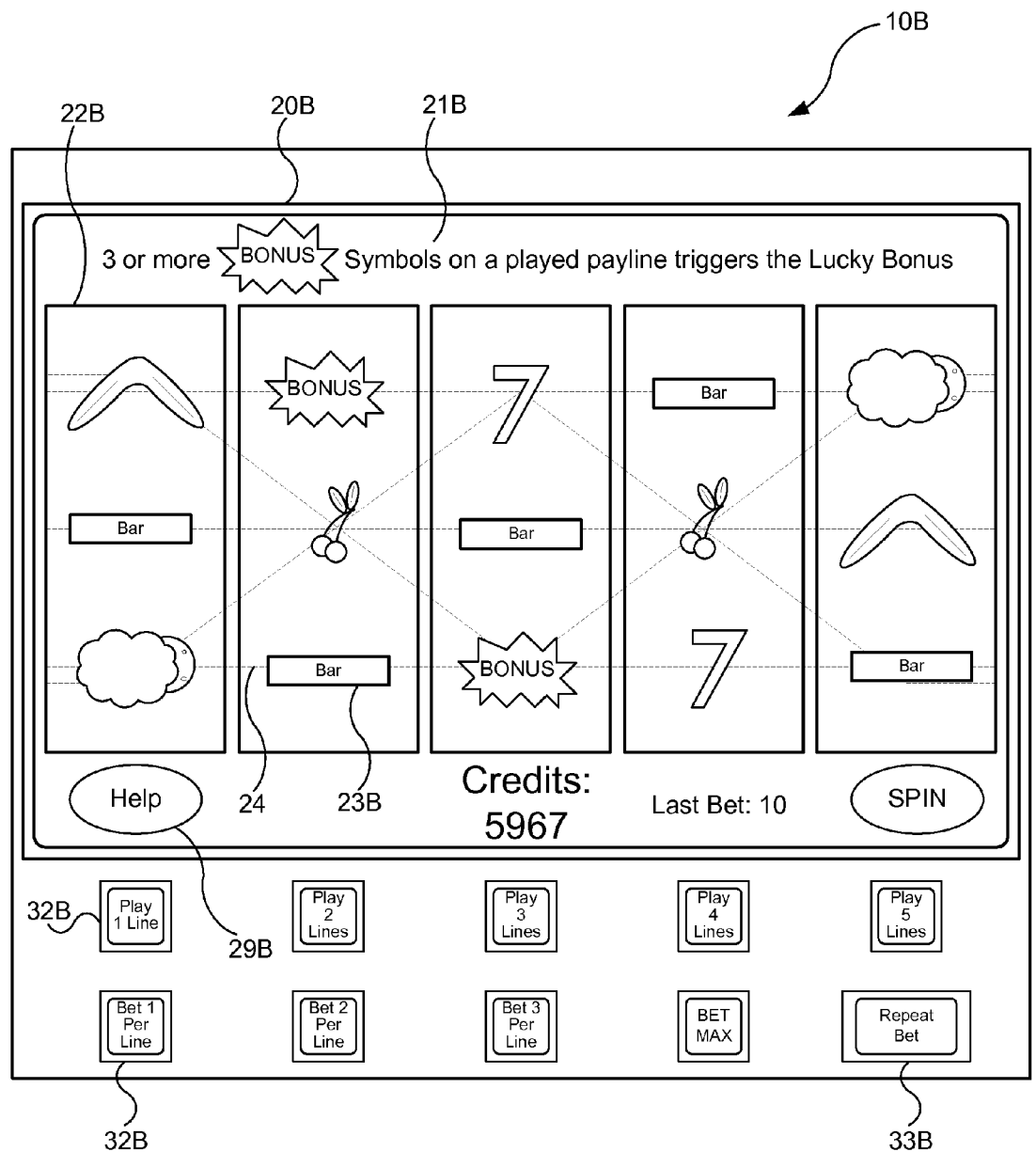
Figure 2C:
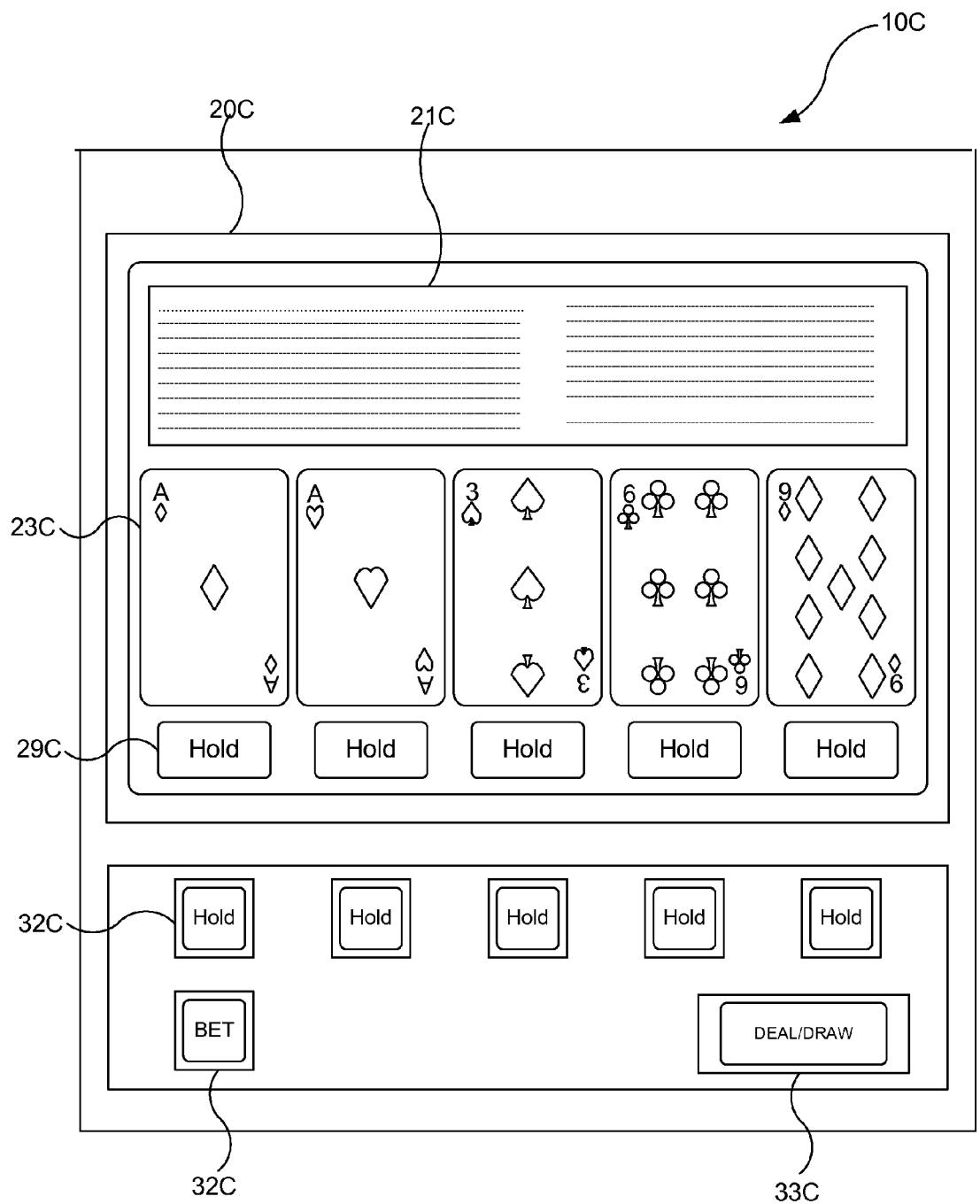

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touch-screen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
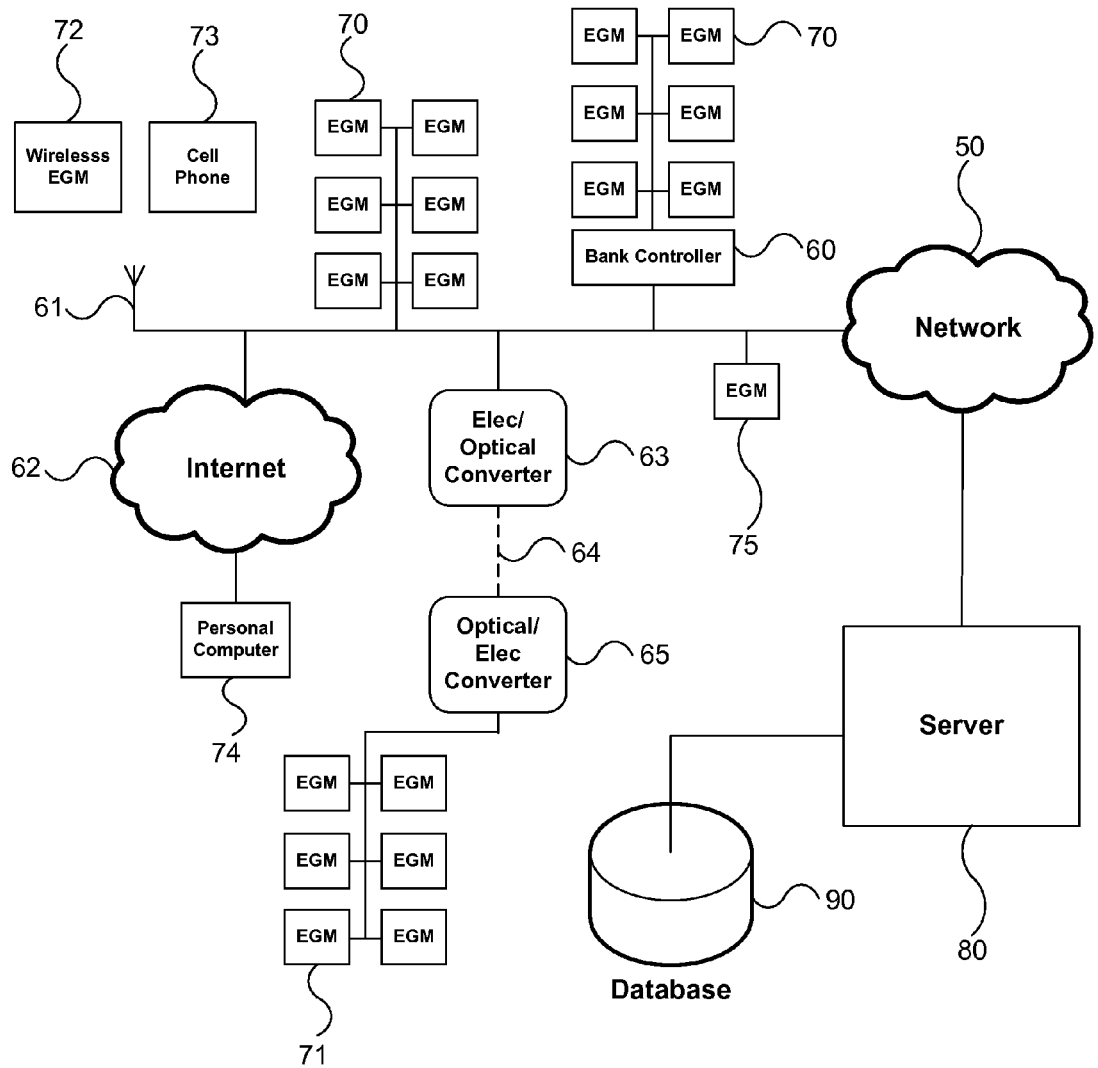
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Because wagering on a gaming device has a strong emotional component, caused in part because of the risk involved in outlaying something of value (usually monetarily based) and the possibility of winning something of even greater value, the player's perception of how events related to this gaming experience unfold partially dictates the player's future wagering choices, from the amounts wagered, to the games they prefer to play, to even the establishment they prefer to play at.

Through an understanding of a player's past behavior, specific desires, likes and dislikes can be learned. Such knowledge is invaluable in improving the player's future experience and thereby creating a more profitable relationship. With this knowledge, profitable changes in game design, floor layout, environmental conditions, loyalty awards, marketing campaigns, employee staffing, and many other areas are possible. One of the most basic, but most difficult to ascertain or measure, is a player's reaction and behavior in relation to the game on the gaming device itself.

Player behavior may be recorded and categorized in various formats. For example, a specific player's behavior may be analyzed, player behavior on a specific gaming device or type of gaming device may be analyzed, time-based or condition-based player behavior may be analyzed, or player behavior for a particular gaming area (such as floor location, casino property, or even geographic location) may be analyzed. Although any specific player's behavior may be analyzed over a short term at a single gaming device, a long term analysis of a player's behavior over many gaming sessions at multiple gaming devices requires that the player be an identified player and their play may be associated and/or stored with the player's data on a player tracking server or database 80 or 90 (FIG. 3). Analysis of specific player's behavior may help a casino better serve that specific player, which may be particularly important not only for traditional, "high-roller" players but to identify players whose affinity, habits and budget makes them candidates for development into high roller status.

For a single gaming device or type of device, the behavior of multiple players may be recorded and analyzed to determine general reactions to gaming device or circumstances occurring on the gaming device. Analysis of this player behavior may help in the design of gaming devices (as mentioned above) or to better understand a player's reaction to certain game outputs. For time-based and location based player behavior analysis, player behavior may be analyzed to determine if players are influenced or affected by gaming at certain times of the day, gaming in certain areas of the casino, or gaming during a promotion or special event occurring at the casino.

As described above, after a player has inserted credits, play of a gaming device typically includes a player performing some combination of pressing buttons, pulling a gaming handle, and/or activating a switch. This combination of actions may include choosing a game to wager on, selecting game parameters, adjusting a wager type or size, and initiating a game. The game itself is displayed on the game display including the display of a final game result and any intermediate steps of the game that require player interaction, such as when a bonus game is triggered during the game.

The button, switch, and bill acceptor can be referred to as player interface points and the player's actions can be referred to as interactions with these player interface points. However, interactions between a player and a gaming device can be more broadly defined as any input from a player to a gaming device and any output from the gaming device to the player. Each of these interactions could be the source of a data point for later analysis to help understand many facets of the player experience. For example, such data could be used to analyze a specific player's behavior, average behavior for many players, and/or typical behavior in response to environmental conditions. As these interactions may be used to analyze player behavior, the interactions are recorded so that they may be later analyzed.

In some embodiments, interactions that may be recorded include physical interactions between the player and the gaming device, such as button presses, game handle pulls, insertion of money into the gaming device, player identification actions, activities on a gaming display touchscreen, activities on a keypad or other input device, etc. Additionally, interactions in various other embodiments may include game device outputs that are perceivable to the player, such as the display of a game, a display of a game result, a particular auditory or visual signal, a touch-based action, etc. From an operation standpoint, interactions may include signals received that are associated with a player input to the gaming device and signals generated to output data to the player. Depending on the level of scrutiny desired, these interactions may be detailed enough to include recording individual reel stops, credit meter decrementing, auditory signal initiation and completion, or light flashes. In other embodiments, the interactions to be recorded and analyzed may be defined as any physical player input relating to the play of the gaming device and at least one of a display of a gaming result, an intermediate game step, or a bonus.

As an example of how such data could be collected, to begin a gaming session a player inserts one or more coins or forms of currency. Next, the player selects a wager size and then pushes the play button, which causes the game to begin operation at the player's chosen wager amount. Also important is the manner in which a player makes a wager. Many gaming machines include "bet one" and "bet max" wager buttons, for respectively wagering a single credit or maximum credits on a game. A three credit wager, for example, is accomplished by either pressing the "bet max" button a single time or pressing "bet one" three times. Players often prefer to alternate between the methods in the belief that the game outcome is altered in their favor by doing so. Also, many games today include both "hard" buttons, which are physical switches located on a panel below the game screen and "soft" buttons which are implemented on a video screen with a touch panel overlay. Often, the same function is implemented in both button styles. Important clues to a player's personality—or even just the utility of alternative inputs—are gleaned by analyzing which buttons players choose to press to accomplish a given goal.

After a game is completed, the player may repeat the wager or change the amount in subsequent games played. The player may play until all funds are exhausted at which time the player can insert additional money or leave the game. Additionally, the player may choose to cash out of the game by pressing the "Cash Out" button. The player may also adjust the audio volume of game sound effects by pressing a button one or more times. Other player-affected buttons or switches may include lines per wager as well as bet size/line, bonus initiation, help and pay table activations. Each of these actions by the player can be recorded by the gaming device and stored as data to be analyzed. In other words, a player initiates every action by either inserting wager values or activating a series of one or more buttons. Therefore, if all wager insertions and button activations are recorded and later replayed or otherwise analyzed, player behavior on a given gaming machine can be precisely observed.

According to some embodiments of the invention, every action, whether wager insertion or button press, is recorded with a time stamp which allows analysis not only of the specific steps followed in playing a game but the exact timing with which a game is played as well. This information can be useful because there can be clues regarding how long a player hesitates between playing each game, for example. It is useful to record each action with the absolute time and date to a high precision, for example, to a precision of about 10 milliseconds.

In other embodiments of the invention, only selected or predetermined interactions may be recorded. For example, if an analysis of a player's behavior after a jackpot win is to be completed, a sequence of interactions may be recorded after the occurrence of a jackpot win. That is, the interactions between the player and the gaming device are only recorded after a jackpot win to determine player behavior in such a circumstance. The interactions after a jackpot win may be recorded for a predetermined number of interactions, the interactions may be recorded for a predetermined amount of time, or the interactions may be recorded until another predefined event occurs. In another example, a casino may want to observe player behavior after a sting of losses. In such a scenario, interactions between a player and a gaming device may only be recorded after a predetermined number of consecutive losses. Although, the above examples illustrate two ways selective recording may be utilized, all variations and possible combinations of selective recording is contemplated by this invention. In addition, a casino operator or other administrator may control which interactions are recorded, set rules and parameters for starting and ending recordings, and define the format and output of the recordings.

Figure 4:
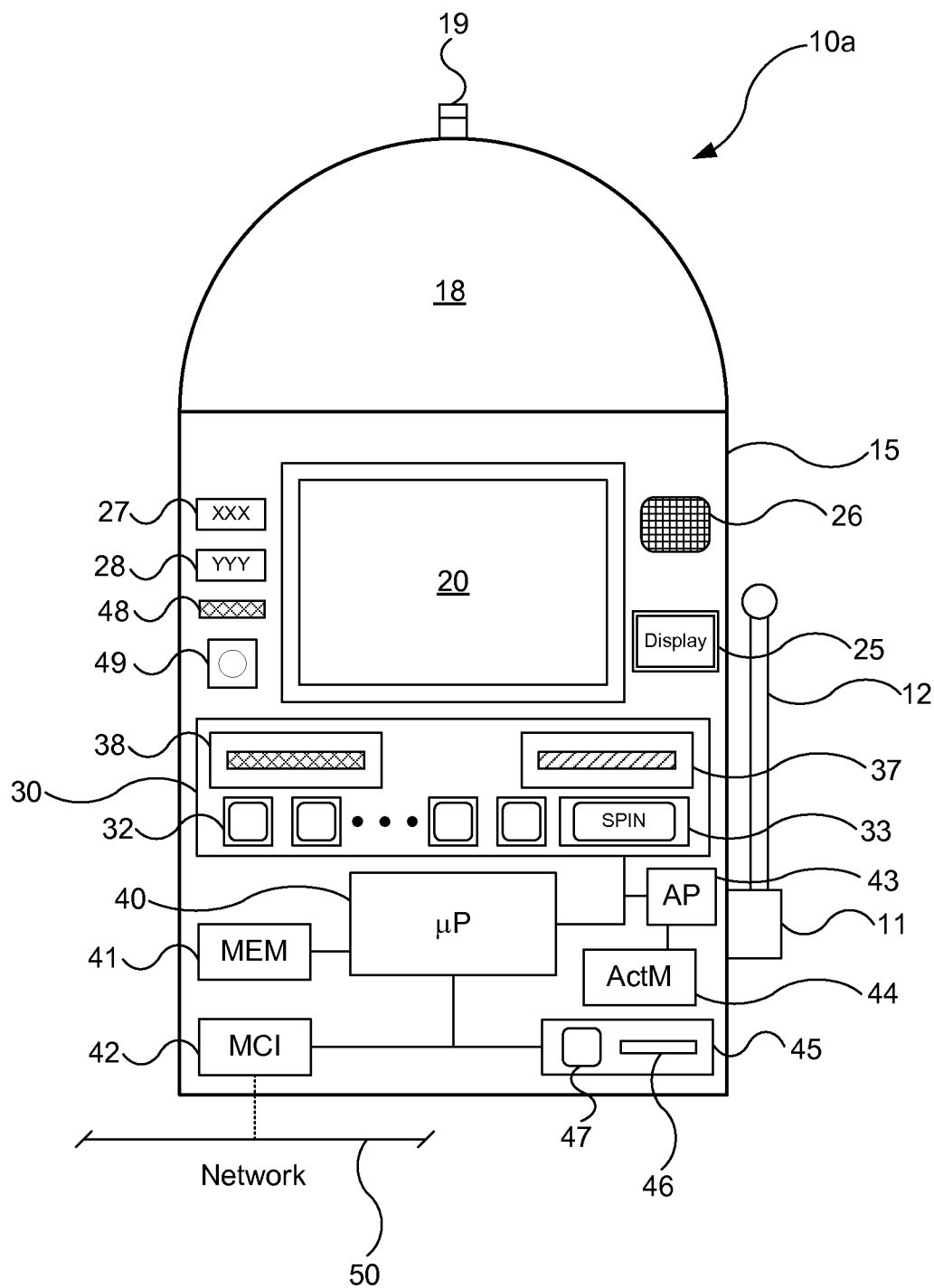
FIG. 4 is a functional block diagram that illustrates a gaming device according to embodiments of the invention.

FIG. 4 is a functional block diagram that illustrates a gaming device according to embodiments of the invention. Referring to FIG. 4, in addition to the components illustrated in FIG. 1A, the gaming device 10a includes an activity processor 43, an activity memory 44, a sensor 48, and a camera 49. The activity processor 43 can collect data in response to actions by a player on the gaming device 10a. The activity processor 43 can store the collected data in the activity memory 44. The sensor 48 can collect data from the environment surrounding the gaming device 10a such as sound, temperature, lighting level, humidity, and smoke level, among other things. The sensor 48 can also collect data related to the player, including, among other things, respiration rate and breath alcohol level. The sensor 48 could be an individual sensor, a sensor array, or a plurality of different individual sensors. The sensor 48 can provide collected data to the activity processor 43 for processing and/or storage in activity memory 44. The camera 49 can be used to generate images of the player. The images can be provided to the activity processor 43 for processing and/or storage in activity memory 44. As further described below, the images can be used to determine the player's responses to various gaming session events.

A person of ordinary skill in the art will appreciate that any of the data collected or analyzed by the activity processor 43 can be provided to an external device on the network 50 through the machine communication interface 42. Also, the activity processor 43 and the activity memory 44 are described above as discrete components. However, a person of ordinary skill in the art will appreciate that the activity processor 43 can be incorporated into the microprocessor 40 and the activity memory 44 can be incorporated into the memory 41. It may be desirable to have a separate activity processor 43 and activity memory 44 so that the microprocessor 40 and memory 41 can be dedicated to other operations of the gaming device 10*a*. Further, the activity processor 43 and activity memory 44 are shown as being inside the gaming device 10*a*. However, the activity processor 43 and activity memory 44 can be components in an activity tracking unit that is physically located external to the gaming device 10*a*, but that is connected to the gaming device 10*a* in order to collect the data described above.

As an example of how the gaming device 10*a* can be used to collect data, a player could insert a $20 bill into the gaming device 10*a* on 19 Sep. 2008, at 17:50 PM. Next, the player presses the "Bet One Credit" button three times in succession and then presses the "Game Play" button shortly thereafter. In response to these actions, the activity processor 43 can generate activity records for each interaction. Activity records may be stored in a session report created for a gaming session, which is discussed below with respect to FIGS. 6B and 7. A session report that includes the activity records for this sequence could look like this:

| GAMEID | ACTION | DATE | TIME |
|---|---|---|---|
| 1503 | $20 Inserted | 2008/09/19 | 17:50:00.00 |
| 1503 | Bet 1 | 2008/09/19 | 17:50:01.20 |
| 1503 | Bet 1 | 2008/09/19 | 17:50:02.02 |
| 1503 | Bet 1 | 2008/09/19 | 17:50:02.95 |
| 1503 | Play | 2008/09/19 | 17:50:03.88 |

GAMEID represents a unique identifier for the gaming device being played. ACTION is the action taken by the player, DATE is the date the action occurred, and TIME is the time at which the action occurred. In other words, on Sep. 19, 2008 at 17:50:01.20, a $20 bill was inserted into machine 1503. The term 17:50:01.20 indicates the action occurred at 17 hours, fifty minutes and 1.20 seconds after midnight on Sep. 19, 2008. Although shown as text strings in the activity record above, a person of ordinary skill in the art will appreciate that any of the entries in the activity record could be recorded as an encoded value rather than a descriptive text string. For example, instead of stating "$20 Inserted", the activity record can include a code such as "INS_20" or "BA_20" (symbolizing $20 in the bill acceptor).

While year, month, date and absolute time are useful, they may be omitted for some forms of analysis. Further, one of skill in the art of would appreciate that GAMEID could be numeric, alphanumeric or some other coding system, so long as each game is uniquely identified. In this example, actions are measured to within 10 milliseconds of precision. Greater precision is possible but there may be diminishing returns with respect to measuring human behavior much more precisely. It is also possible to use less precision, measuring to the nearest 0.1 second for example, though a loss of too much precision may mask valuable player behavior information. Further, some information may be recorded at different precision levels than other information.

As described above, the activity processor 43 is responsible for collection of the above-described data. This method may be preferable in some embodiments because it is typically much less expensive to implement as there is no need to install separate wires to each input mechanism in the gaming device 10*a*. However, collection of such data may be accomplished in any number of other ways. For example, each button, switch, wager input device, etc. could be wired to a recording computer. The recording computer could read each action in parallel with the gaming device microprocessor 40. One of ordinary skill in the art will recognize that there are many other ways to collect action information which all are useful with this invention.

The above example illustrates just a small portion of the information that can be collected for each data point. For example, through the sensor 48 information such as sound, temperature, player alcohol level, smoke level and humidity could be logged for each data point. Further, through the camera 49, images of the player could be captured and associated with each data point. Capturing images and associating them with every data point may require large amounts of memory to store all of the data points and may implicate some privacy concerns. Consequently, according to some embodiments, the images captured by the camera 49 are analyzed to produce a small string of values representing desired information extracted from the images that do not necessarily identify the particular player. In this way, the desired information contained in the image can be saved without the necessity of large amounts of memory to save the entire image and without raising privacy issues.

Figure 5:
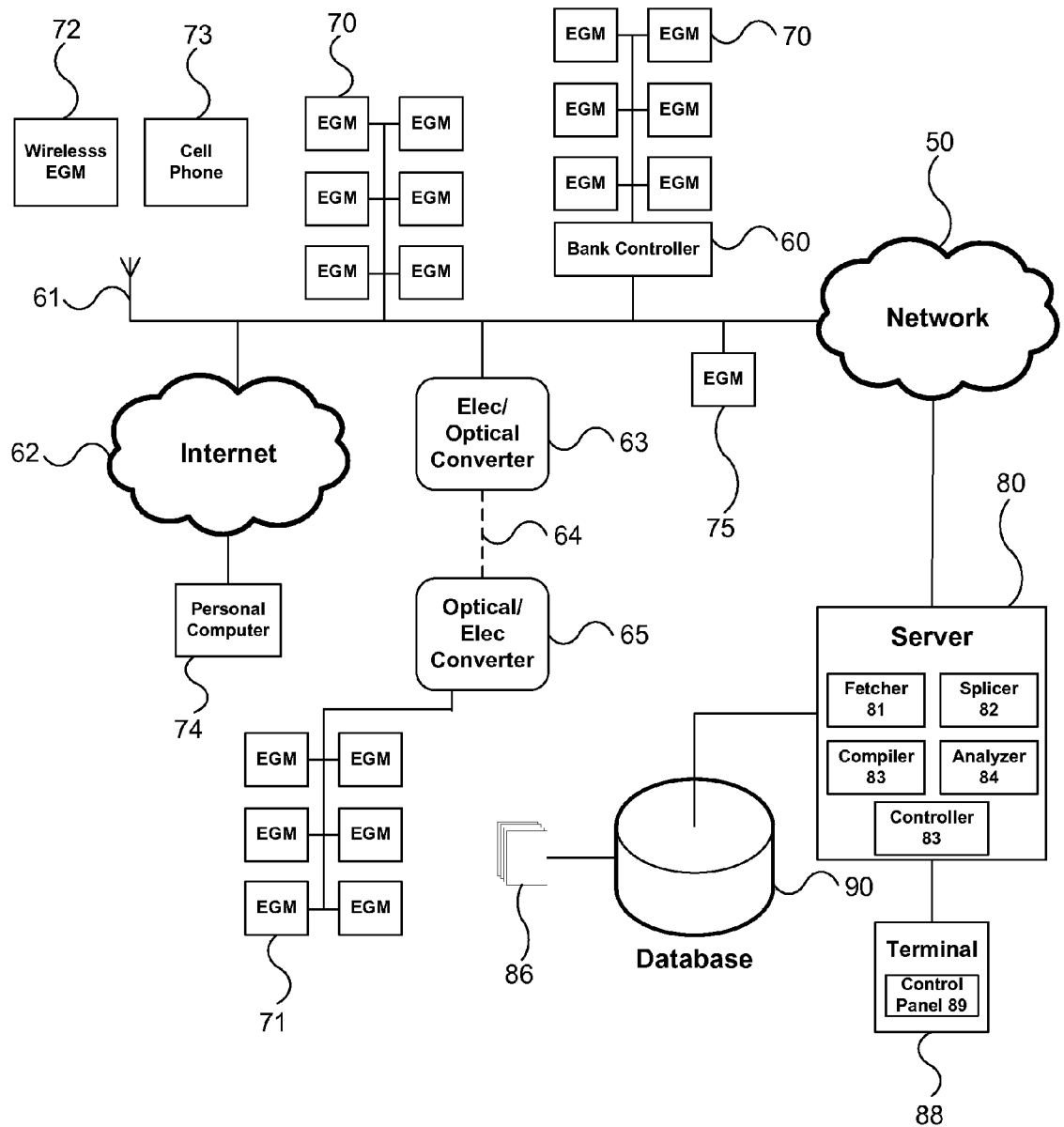
FIG. 5 is a functional block diagram of a networked gaming system according to embodiments of the invention.

Although, the sensor 48 and the camera 49 are shown as part of the gaming device 10*a* in the embodiment illustrated in FIG. 4, one or both of the sensor 48 and the camera 49 may be separate from the gaming device 10*a* in other embodiments. For example, a sensor 48 may be located within a bank of gaming machines and associated with each gaming machine in the bank through the bank controller 60 (FIG. 5). Since many environmental conditions are similar within a relatively small gaming area, a single sensor for a group of gaming devices may render sufficiently accurate readings without requiring each device to be fitted with a sensor. The sensor may be connected to each of the gaming devices so that recorded activities occurring on the gaming devices may be associated with readings taken by the remote sensor.

In another example, the camera 49 could be positioned behind or above a gaming device so that it could be used to record a different angle, or so that it could be used to record gaming activity at several gaming machines. A remote camera may also be controlled by a casino operator or other administrator so that it may move and/or zoom to record different gaming activities among multiple gaming devices. Other embodiments may employ the cameras and sophisticated security system that are already in use in many casinos and gaming establishments. In these embodiments, a security server may be connected to a terminal (e.g., 88 FIG. 5) used to analyze player behavior so that an operator at a terminal can access and control cameras and other devices that are part of the existing security system.

An image feature extraction algorithm could be used (for example, in the activity processor 43) to extract desired information from images captured by the camera 49. The algorithm could use specified feature points in an image of the player's face to determine the player's mood. This information could then be codified with a set of pre-determined values that store the desired information in a small amount of storage space. Each mood can be represented by multiple levels so that a player's mood could be associated with the actions on the gaming device 10a. For example, after a first losing result, the algorithm may determine that a player has a level one disappointment mood. The player's disappointment mood may move through several levels as the player continues to get losing results in subsequent gaming sessions. After several sessions, the algorithm may determine that the player has moved to a level one frustration mood. As the player continues to initiate gaming sessions, the player's mood may move to level three frustration and the player may cease playing at this point. Analyzing this set of data points could lead to the conclusion that at level three frustration, this particular player is likely to stop playing. Collecting this type of information for individual players and groups of players can be useful to the operator of the casino in managing the gaming experience.

The sensor 48 can also include a microphone that is used to record utterances from the player in response to events on the gaming device 10a. Such utterances could be used in conjunction with images captured by the camera 49 to help determine the player's mood. Alternatively, the utterances could be used separately to determine information about the player. The information from the microphone could be used with a voice recognition algorithm to determine what the player is saying, and the output of the voice recognition algorithm could be stored with the data points in the activity records described above. For example, a data point showing the player stopping play provides some utility in determining player behavior. However, a data point showing the player stopping play in conjunction with one of the following utterances: "This machine will never pay"; or "Oh, time to go to my meeting"; provides much more information.

According to some embodiments, the outcome of each gaming event, or interim step within a gaming event, is also recorded, as are game malfunctions and other play interruptions.

Additionally, several interactions that are recorded may occur within a single gaming event. For example, a player may press the "Bet 5 Lines" button, then press the "Bet 1 Credit per Line" button (which initiates the game), and then receive the result of the game wager (all reels are stopped to show the game outcome). In this example, the gaming event may record three game interactions within the one gaming event. In another example, a player may press the same buttons in the same order, but more interactions may be recorded. That is, the following interactions may be recorded: 1) the line-bet button press, 2) the bet-per-line button press, 3) the initiation of spinning the game reels, 4) stopping the first reel, 5) stopping the second reel, 6) stopping the third reel, 7) stopping the fourth reel, and 8) stopping the fifth reel. If a bonus game is provided within a gaming device, the time a bonus game begins and ends, as well as player behavior during the bonus game and bonus game results can all be recorded. Game configuration information can also be recorded, either as a unique record associated either directly or indirectly with the GAMEID, transmitted with each activity record, or transmitted as part of the session report. One of skill in the art will recognize that there are many ways to efficiently store information and all such ways are useful with this invention.

Also, it may be desirable to record each player identifier insertion and removal from the player tracking unit 45. According to some embodiments of the invention, all button presses on the player tracking unit 45 can also be recorded and optionally time stamped. In this way, events and actions on the gaming device 10a can be associated with specific players.

As described above, activity records can be stored in the activity memory 44 on a temporary or permanent basis. This information can be replayed at the game device 10a or transferred to another location for analysis (through the network 50 for example). When information is analyzed at the gaming device 10a, a separate analysis device is not needed. However, the information is reviewed on the gaming device 10a itself, which is typically located on the casino floor. Thus, review and analysis on the gaming device 10a can be inconvenient for the administrator and could block or otherwise limit customer play while the analysis is performed.

According to some embodiments, historical activity records are collected by the activity processor 43 and stored only temporarily in the activity memory 44. At pre-determined intervals, or in response to a query, the historical records can be forwarded to one or more other devices for later analysis. These analysis devices can also be used to perform analysis on information from a number of other gaming devices or even to ultimately combine information from many gaming devices and/or many gaming device play sessions into a single report. Another benefit of forwarding historical records to other devices for analysis is that multiple copies of historical records can be created and used for backup in case the original copy is altered or destroyed.

FIG. 5 is a functional block diagram of a networked gaming system according to embodiments of the invention.

Referring to FIG. 5, in addition to the components illustrated in FIG. 3, the networked gaming system includes a remote server 80 and an analysis terminal ("terminal") 88 connected to the server 80. The server 80 may include a fetcher 81, a splicer 82, a compiler 83, and an analyzer 84. Although these elements are shown as part of the server 80, one or more of these elements may be independent from the server 80 and connected to the server 80 through the network 50. The fetcher 81 may be configured to retrieve a session report 86 from a selected one of the gaming devices 70, or from a connected database 90. The splicer 82 may be configured to stitch together activity records from the fetched session report 86. The compiler may be configured to generate a representative gaming session from the stitched activity records. The processes of retrieving the session reports, stitching together the activity records, and generating a representative gaming session is described in more detail below.

As play proceeds in the casino, individual gaming devices 70 may generate session reports including activity records, which are stored at the individual gaming devices. At predetermined intervals, or in response to a query from the gaming server 80, all or a portion of the individual gaming devices 70 can upload their respective session reports to the gaming server 80 across the network 50. The gaming server 80 can then store the session reports 86 in a database 90. The session reports 86 may include the activity records of the interactions between a player and a gaming device and various other information about the game session, such as image data from the camera, sensor readings from the sensor, or other game data.

At some pre-determined interval, or in response to a query from an administrator, the analyzer 84 can retrieve the session reports 86 from the database 90 and analyze the information contained therein. The analyzer 84 can use the information contained in the session reports 86 to generate any number of pre-defined reports or recreations of the gaming session. Additionally, the pre-defined reports may display the information from the session reports 86 as summarized numerical figures, graphs, or charts. The analyzer 84 may also be configured to detect patterns in player behavior from the session reports 86 stored in the database 90. The pre-defined reports may include formatting the session reports 86 to show selected information within the session reports 86. That is, the analyzer 84 may be configured to search through the session reports 86 looking for specific data points or trends that indicate some occurrence of consequence, such as many unusually high payouts to a single player. In the event that such an occurrence is discovered, the analyzer 84 may trigger a notification for an operator or administrator, or simply note such an occurrence on the gaming server 80.

The analysis terminal 88 can be a standard computer that is connected to the server 80 through the network 50. The analysis terminal 88 can be used to view reports generated by the analyzer 84 and to view representative gaming sessions generated from the session reports 86. In other embodiments, the terminal 88 may include a gaming machine that is directly wired to the server 80, where a representative gaming session can be shown on the gaming machine under control of the server 80. The terminal 88 may also include a control interface 89 to allow an operator to input data that is to be associated with the session report and control the playback of the representative gaming session.

The server may also include a controller 85 that is configured to alter game parameters on at least one of the plurality of gaming devices. The controller 85 may alter these game parameters based on instructions received from an operator at the terminal 88. That is, an operator may observe player behavior at the terminal that leads the operator to conclude that game parameters should be altered on the game floor to elicit the observed player behavior (if it was desirable) or prevent the observed player behavior (if it was not desirable). Additionally, the controller 85 may be configured to alter game parameters based upon an automatically detected pattern of player behavior as determined by the analyzer 84. For example, if the analyzer examines multiple session reports for a particular game with five reels and notices that players are generally "slamming" through the game when the last two reels are still spinning, the controller 85 may direct the gaming device to decrease the time between stopping each reel to speed up the games. This process may act as a control feed back loop, where a certain game parameter is continually altered in response to analyzed player behavior in an effort to reach an optimum steady state game configuration. Additionally, for session reports that are tracked for a specific identified player, the controller 85 may alter the game parameters of a game that identifies that specific player as the player playing the gaming device. For example, if it is noted that certain player has a behavioral reaction to a certain circumstance, the controller 85 may modify the game parameters at a game where the specific player has inserted a player club card.

Because there are so many potentially important clues within historical activity records, it can be helpful for the administrator to view the information in a manner as close to watching a real player as possible. For example, the terminal 88 may render an image of the gaming device(s) for which representative gaming sessions 86 are being examined. This rendering, or simulation, could be generalized or very specific and detailed to the particular game being analyzed. In the case in which the player identifier is included in the session report 86, it is often possible to track the play of a player across multiple gaming devices to ascertain whether the player's behavior changes when they begin play on a new gaming device. The terminal 88 can optionally show a photo of the player (which can be taken from the database 90 or the camera 49 via the session report 86) in order to have a clearer picture of the gaming session.

As the gaming session is simulated on the terminal 88 from the session reports 86, each button press could be highlighted in a simulation screen and the actions of the game could be simulated on the screen as well. For example, spinning reels with symbols matching that of the game being played could be rendered for viewing by the operator or administrator. Further, the status of credit meters, win meters and other information can be accurately calculated and updated as the gaming session continues, giving the operator a detailed picture of the gaming session. The simulation on the terminal 88 can run in real time, that is at the same speed as actual play occurred, or in a faster or slower manner. The operator can pause and rewind the simulation using the control panel 89, just as if he were viewing a video recording of the gaming session.

Once an interesting play pattern or other occurrence is detected, the administrator can examine other play sessions by the same player, or by other players, to see if the pattern is repeated. In this way, the administrator can learn from these session reports 86 how players react in various situations related to gaming sessions. If an undesirable reaction is found to repeatedly occur, the gaming device(s) can be modified to overcome the undesirable behavior either through the controller 85 as described above, through changes to the gaming device on the casino floor, or through game design for the next generation of gaming devices. Then, new gaming sessions can be recorded on the modified gaming device to see if the undesirable behavior has been reduced or eliminated. By repeatedly measuring behavior and changing game play parameters to eliminate undesirable behaviors and increase the frequency of desirable behaviors, player enjoyment of games can be enhanced along with game play efficiency.

Figure 6A:
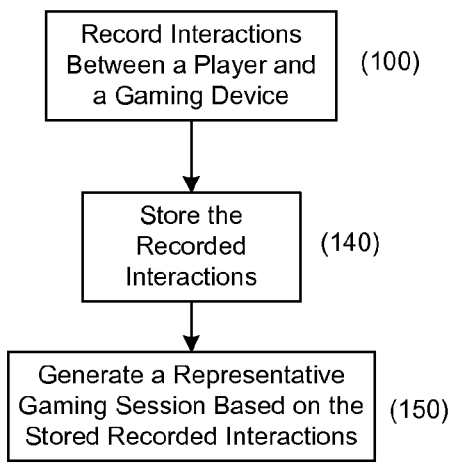
FIGS. 6A and 6B are flow diagrams of a method of analyzing player behavior at a gaming device according to embodiments of the invention.
Figure 6B:
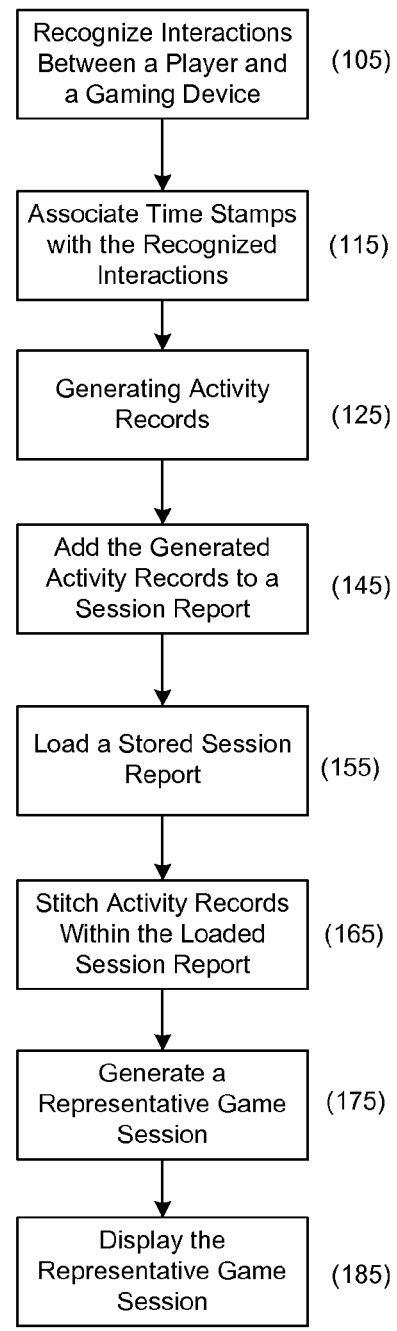

FIGS. 6A and 6B are flow diagrams of a method of analyzing player behavior at a gaming device according to embodiments of the invention. An overview of possible steps within these illustrated embodiments will be discussed briefly before examining additional details and variations about these and other embodiments.

Referring to FIG. 6A, the method of analyzing player behavior at a gaming device may include recording interactions between a player and a gaming device (100), storing the recorded interactions (140), and generating a representative gaming session based on the stored recorded interactions (150).

FIG. 6B includes exemplary details about features that could be implemented in the embodiments illustrated in FIG. 6A. Referring to FIG. 6B, the method of analyzing player behavior at a gaming device may include recognizing interactions between a player and a gaming device (105), associating time stamps with the recognized interactions (115), and generating activity records based on the recognized interactions and associated time stamps (125). The method may also include adding the generated activity record to a session report (145). The session report may then be used to recreate a game session so that the player behavior can be analyzed. Here, the method includes loading a stored session report (155), stitching activity records within the loaded session report together (165), and generating a representative game session (175). The representative game session may be further displayed (185) so that player behavior can be observed.

As described above, player behavior may in part be characterized by a player's reaction to events that occur on the gaming device. In some embodiments, a selected subset of interactions between a player and a gaming device may be recorded around a predetermined event while other interactions are not recorded to determine how a player or various players behave in relation to the predetermined event. In other embodiments, every interaction between a player and a gaming device may be recorded to perceive a more complete understanding of player behavior. Interactions that may be recorded include physical interactions between the player and the gaming device, such as button presses, game handle pulls, insertion of money into the gaming device, player identification actions, activities on a gaming display touchscreen, activities on a keypad or other input device, etc. Additionally, interactions may include game device outputs that are perceivable to the player, such as the display of a game, a display of a game result, a reduction of credits on a credit meter, a particular auditory or visual signal, a touch-based action, etc.

Referring again to FIGS. 6A and 6B, the step of recording these interactions between a player and a gaming device (100) may be accomplished in some embodiments by recognizing a type of interaction that has occurred between the player and the gaming device (105). In embodiments where only a selected subset of interactions is recorded, recognizing the type of interaction includes a determination that the interaction is selected to be recorded. The recognition may occur substantially simultaneously or in parallel to the performance of a function related to the interaction, or may occur at a relatively short time after the performance of the function. For example, when a player presses a "SPIN" button, the game processor 40 (FIG. 4) may receive a signal that the "SPIN" button 33 has been activated, and perform an action based on the received signal. The game processor 40 may also recognize that the activation of the "SPIN" button 33 is related to an interaction between the player and the gaming device. The recognition of this interaction may include saving an identifier associated with the activation of the "SPIN" button in a temporary memory or storage area, such as processor cache or Random Access Memory (not shown), device memory 41, or activity memory 44.

A time stamp may further be associated with the recognized interaction (115), and may also be stored in a temporary memory or storage area. The time stamp may reflect a time that an interaction occurred, a time that interaction is recognized, or a time that is a shifted by a predetermined amount from one of the time of the interaction or recognition. Although the precision of the time stamp may be recorded down to the second in some embodiments, it may be preferable to increase the precision of the time stamp down to hundredths of a second or more to accurately reflect the timing between each interaction. A date of the interaction may further be associated with the interaction. However, because the date does not change at the pace of time, it may be associated with the interaction separately from the time stamp so that resources are not wasted by repeatedly determining and storing the date as part of the time stamp.

For timing purposes, an internal clock (not shown) of the gaming processor 40 (FIG. 4) or activity processor 43 may be used. In other embodiments, a separate timing apparatus may be implemented to record the interaction timing. The time stamp may be the actual time a particular interaction occurred, such as 08:16:44.74 to represent eight sixteen and 44.74 seconds in the morning (AM). Alternatively, the time stamp may reflect the elapsed time from the beginning of a gaming session. That is, in some embodiments, a timer may be implemented to record the time from an initial start point (such as the beginning of a gaming session), where the time of an interaction is recorded as the time-stamp. For example, a time stamp may appear something similar to 00:01:35.75 to represent that an interaction occurred one minute and 35.75 seconds after the beginning of a game session. As discussed below, a session report may include a date and current time information, where the current time information includes the time of the start of a gaming session. Here, the present time of an interaction may still be calculated if needed during analysis by simply adding the recorded time stamp of the interaction to the time the gaming session began to arrive at an actual time the interaction occurred. For example, if a session report recorded the current time at the beginning of a game session as 16:10:22.05 (four ten and 22.05 seconds in the afternoon), the above interaction with the time stamp of 00:01:35.75 would have occurred at 16:11:57.80. As will be readily understood by one of skill in the art, there are many ways in which to encode and record time and/or date information, of which the above described methods are simply examples. All methods of recording time and/or date of occurrence of player activities are useful with this invention.

An activity record may also be generated (125) as part of the recording of an interaction between a player and a gaming device (100). As described above, an activity record may include a game identifier, player identifier, type of interaction, date of interaction, time of interaction (time stamp), and various other game information. In some embodiments, the activity record may also include the amount of time that has elapsed from the previous interaction to the present interaction. This elapsed time may simply be calculated by subtracting the time stamp of the previous interaction from the time stamp of the current interaction. In other embodiments, a timer may be triggered upon the occurrence of an interaction and reset upon the occurrence of a subsequent interaction, where the timer value at the occurrence of the subsequent interaction is used as the elapsed time.

The activity record may then be added to a session report (145) to store the recorded interaction as part of a game session (140). A session report may reflect all of the interactions that occur between a player and a gaming device over a gaming session. A gaming or game session may be defined as the entire time a player plays a particular gaming device, the entire time a player plays any gaming device over a predetermined period, the entire time a player plays any gaming device without a substantial break from gaming, the time associated with a particular amount wagered by a player, the time between insertion of credits by the player, the time between jackpot or other wins by the player, game session may be defined, or any other various metric defining a time of gaming. A session report may include tabulated activity records in a database format, delineated data strings, or other data structures. Activity records may be added to a session report by creating a new entry within the session report and entering the data from the activity record into the new entry in the session report. In other embodiments, an address placeholder or pointer of the memory location of the activity record may be added to the session report. In still other embodiments, the data from the activity records may be reformatted or processed before being added to the session report. For example, an activity record may include a numerical code for the event type and a time-stamp that is reflective of a timer value from the beginning of a gaming session. This data may then be processed so that the event type is described in text strings and the time-stamp value is converted into real time by adding the timer value from the activity record to a saved value of the real time of the beginning of the game session stored in the session report.

A representative gaming session may also be generated from the stored recorded interactions (150). In one embodiment, the session report may be used to recreate the game session so that the player behavior can be analyzed. In order to generate a representative gaming session, a stored session report may be loaded (155) into a processor of the gaming device, or a remote processor depending on whether the representative gaming session is to be displayed on the gaming device or at a remote location. It is generally advantageous to leave gaming devices available to players for wagering in order to make additional revenue. Hence, although a representative gaming session could be displayed on a gaming device during non-peak gaming times (e.g., Tuesday mid-mornings), it may be advantageous to load the session report to a remote server and display the representative gaming session on a separate terminal. As mentioned above, session reports may be stored in temporary or permanent memory on the gaming device. However, they may also be copied or moved to a remote storage location for ease of remote access and to remove the need for additional memory storage in gaming devices.

Once a session report is loaded, the activity records within the session report may be stitched together (165). Stitching the activity records together may include taking the individual records and creating a single data form. For example, if the activity records are stored as delineated data entries, the stitching process may include creating a continuous data form that includes entries for every hundredth of a second. Since interactions do not typically occur every hundredth of a second, the stitching process may insert dummy 'wait' values in for each entry in the continuous data form that does not include an interaction. In other embodiments, the stitching process may include the creation of a multimedia file that places the interactions from the activity records at appropriately spaced intervals. These spaced intervals may reflect real-time intervals or compressed-time intervals.

The stitching process may also include using session report information to load appropriate data to the stitched activity records. For example, if the game ID is stored in the session report, the stitching process may load information about the game to include with the stitched activity records, such as game type, number of reels, game graphics, etc.

A representative game session may then be created from the stitched activity records (175). As described above, the representative game session may simply be a tabulated set of data values outputted in an easy to read/digest format or may be a complete multimedia file that graphically shows the gaming device and an actual audio/visual recreation of the gaming session. Depending on the particular format of the representative gaming session, the creation of this representative gaming session may include minor formatting of the stitched activity records, or may include loading game graphics and precisely incorporating button presses with game initiations, displays of game results, and other game actions together.

The display of the representative game session (185) is also largely driven by the completeness and complexity of the generation of the game session (175). That is, a realistic recreation of the gaming session may be shown on a computer or television display, where a simple time line or tabulation of data may be shown on a display or printed out in a report format. When the representative gaming session is recreated on the gaming device itself, the game processor may trigger the appropriate game displays to illustrate the actions and timing of the player in response to game outputs. A similar representation may be displayed if the remote terminal is a computer controlled game device as described above. If visual data from a camera or environmental data from a sensor are included as part of the session report, these images or data may be displayed in parallel to the display of the gaming device.

Figure 7:
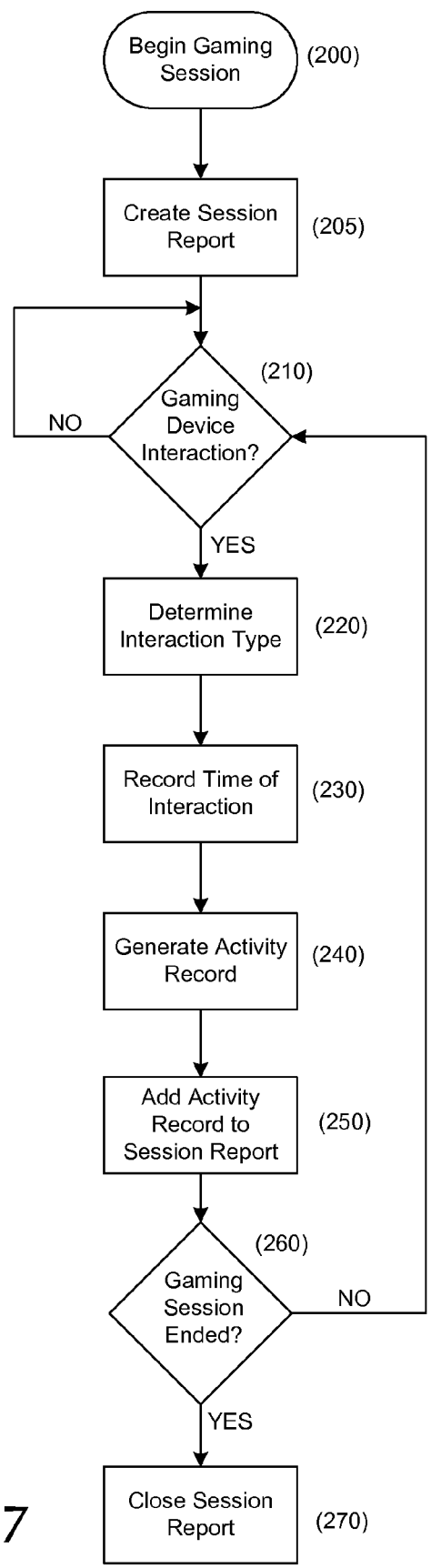
FIG. 7 is a flow diagram of a method of operating a gaming device according to embodiments of the invention.

FIG. 7 is a flow diagram of a method of operating a gaming device according to embodiments of the invention.

In particular, the method illustrated in FIG. 7 may describe embodiments of recording a game session by generating a session report. As described above, a game session may be defined as the entire time a player plays a particular gaming device, the entire time a player plays any gaming device over a predetermined period, the entire time a player plays any gaming device without a substantial break from gaming, the time associated with a particular amount wagered by a player, the time between insertion of credits by the player, the time between jackpot or other wins by the player, the time preceding and/or following a predetermined event, or any other various metrics defining a time of gaming.

Referring to FIG. 7, the method may include beginning a gaming session (200) and creating a session report (205) for the gaming session. As described above, a session report may include multiple activity records that reflect recorded interactions between a player and a gaming device. The creation of a session report (205) may include generating a name or other identifier for the session report. If the session report is to be saved alongside other reports, the name or identifier may be preferably unique and describe one or more attributes about the game session, such as symbols that identify the gaming device, player, time frame, game location, property identification, and/or other similar session information.

After the session report has been generated (205), the gaming device may determine if an interaction to be recorded has occurred between the player and the gaming device (210). Once such an interaction has occurred, the gaming device may determine an interaction type (220), record the time of the interaction (230), and generate an activity record (240) based on the interaction and record time/time stamp. After the activity record has been generated (240), the activity record may be added to the session report (250). As discussed above, the activity records may be added to the session report in database form, in delineated data strings, or in other various storage methods.

In embodiments where only selected interactions are to be recorded around a predetermined event (e.g., the 20 interactions after a jackpot is won are to be recorded), the determination by the gaming device of whether an interaction to be recorded has occurred may include a determination that the predetermined event has occurred and a determination that the interaction is within a defined group of interactions to be recorded. In addition, a session report may not be generated until the predetermined event has occurred (i.e., when the gaming session is determined to include the time following a predetermined event). In such a case, the above determination of whether to record an interaction may include determining whether the interaction is within the sequence of interactions to be recorded after the predetermined event.

The gaming device may then determine if the gaming session has ended (260). For example, the gaming device may determine if the interaction between the player and the gaming device ended the game session, such as the "cash-out" button being pressed, a gaming result occurring that left the credit meter at zero, the insertion of additional credits, etc. In other embodiments, the game device may determine if a certain amount of time had elapsed to end the game session, if a certain number of interactions has occurred after a predetermined event to end the game session, if another predetermined event has occurred to end the present game session and initiate a subsequent game session, if a certain amount of credits had been wagered or won, etc. If a game session is determined not to have ended, the gaming device may again wait for an interaction between the player and the gaming device. If, however it is determined that the gaming session has ended, the gaming device may close the session report (270). Closing the session report may include simply marking an end point in the data within the session report, or may include transferring, copying, and/or storing the session report. In some embodiments, the session report may be stored in temporary or permanent memory in the gaming device. In other embodiments, the session report may be transferred to and stored on a remote server or database. In these embodiments, the session report may be transferred over a wired or wireless network to the remote server or database for storage and/or analysis.

Figure 8:
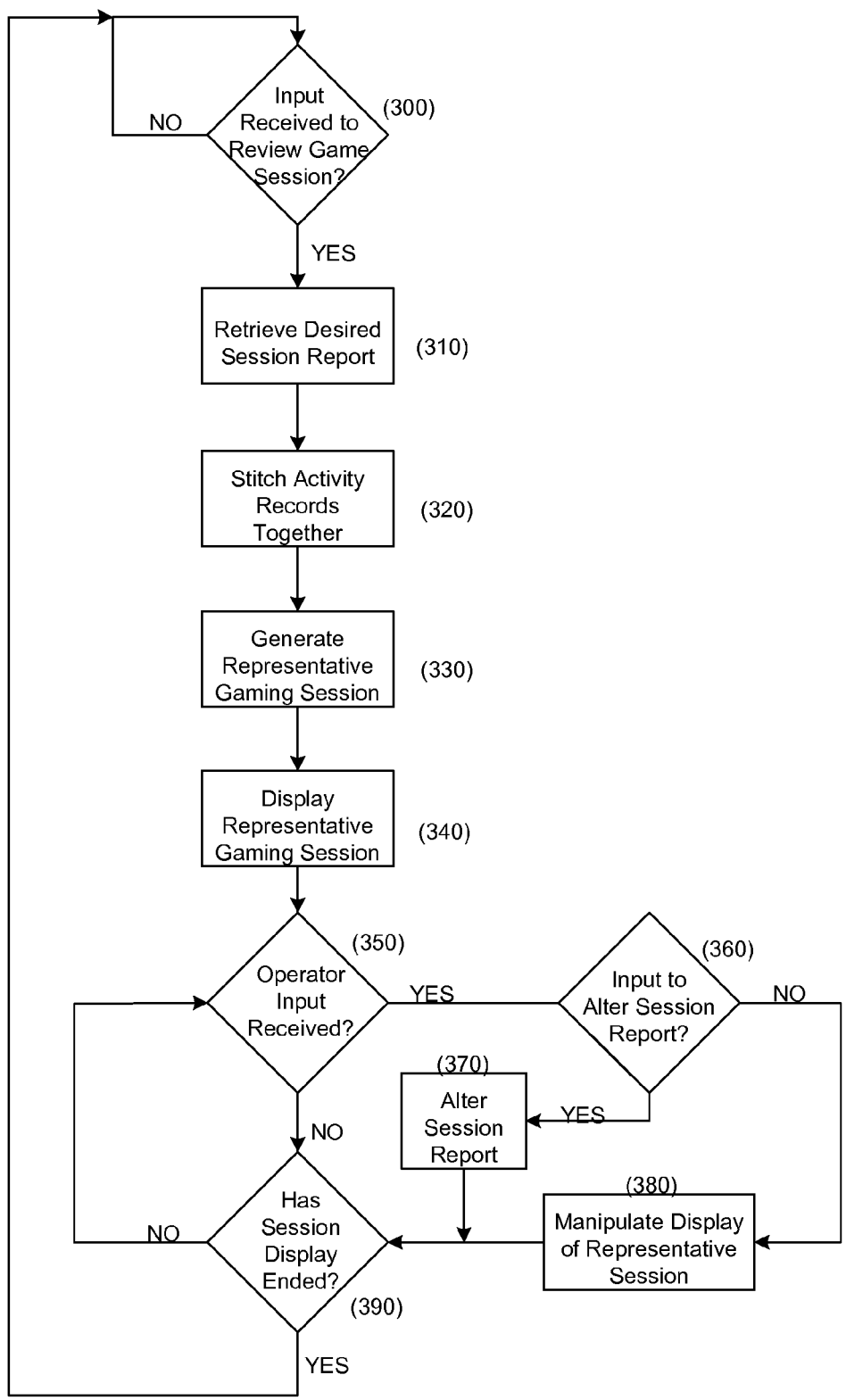
FIG. 8 is a flow diagram of a method of reviewing a gaming session according to embodiments of the invention.

FIG. 8 is a flow diagram of a method of reviewing a gaming session according to embodiments of the invention.

In particular, the method illustrated in FIG. 8 may describe embodiments of generating and displaying a representative gaming session. As described above, a gaming session can take many different forms depending on the information that is desired to be analyzed. Since it may be desirable to obtain player behavior information about a certain player, a certain gaming device theme, a certain gaming device location, or other metric, the saving and recreating of gaming sessions may be tailored to address and analyze a specific category of information. Further, a gaming session may be analyzed at the gaming device itself or a remote terminal. As discussed above, it is usually advantageous to keep gaming devices available for wagering. Hence, gaming sessions may be preferably reviewed at a remote terminal.

Referring to FIG. 8, the method may include determining if an input has been received to review a gaming session (300). If an input has been received, a session report associated with the identified gaming session may be retrieved (310). If a session report is permanently stored or currently stored on a gaming device, retrieval of the session report (310) may include contacting the gaming device over a network or other connection and loading the session report to a remote server or database. If the representative gaming session is to be displayed on the gaming device itself, or if the associated session report has already be stored in a location separate from the gaming device, retrieval of the session report (310) may include identifying and loading the desired session report.

After a session report has been retrieved, the activity records within the session report may be stitched together (320). As discussed above, stitching together the activity records within a session report may be carried out in various manners to transform the individual activity records into a continuous data structure. After the activity records within the session report are stitched together, a representative gaming session may be generated (330). Generating the representative gaming session may include transforming the stitched activity records into a format that can be displayed to and reviewed by a human operator, or into a format that can be manipulated by a computer analyzer. If the representative gaming session in generated for a human operator, the representative gaming session is then displayed (340).

In embodiments where only a specific group of interactions proximately located to (i.e., preceding and/or following) a predetermined interaction are to be reviewed, the stitching process (320) may include identifying which of the activity records in a session report are to be extracted and stitched together. That is, not all activity records within a session report are necessarily stitched together since the operator may request a representative gaming session that includes only a portion of session report or several portions of multiple session reports.

During the display of the representative gaming session, it may be determined if an input has been received from the operator (350) to manipulate the session. If no operator input is detected, it may also be determined if the representative game session has ended (390). These two determinations may continue until an operator input is received or the representative game session ends.

If an operator input is received, it may be determined what type of operator input has been received (360). That is, it may be determined whether the operator input aims to alter the session report or merely to manipulate the display of the representative gaming session. If the operator notes a particular type of player behavior in reviewing the representative game session, the operator may want to add notes or code symbols to identify the player behavior with a particular game interaction or outcome. For example, the operator may notice that a particular player always increases his or her bet after receiving five losing outcomes. Here, the operator may want to note that this player expects that the game is "due" for a win because several losing outcomes have been received consecutively. In another example, the operator may notice that most players on a particular game play at a faster rate of speed after hitting a bonus win. Here, the operator may note that players in general feel lucky or hot after hitting bonus wins on this particular game. Thus, an operator may want to add notes or flag a session report to show a particular trend or indication of player behavior. In such a circumstance where an operator input is received and determined to be an input to alter the session report (360), the session report may be altered (370) to reflect this input. In addition, an operator may trim a session report (i.e., save only a portion of the activity records within the session report and discard the remainder of the activity records) or join multiple session reports together. For example, a specific type of player behavior may be isolated for analysis or periods of inactivity or activities of low interest may be removed from the session report. In such instances, the operator may manually use the terminal to alter the session report (360/370). In other embodiments, the operator may utilize the analyzer 84 (FIG. 5) or another algorithm on the server 80 or terminal 88 to automatically go through a desired session report or multiple session reports to trim and/or join the session reports.

Operator inputs may also be received to manipulate the display of the representative game session (380). For example, an operator may 'fast-forward' or skip through a portion of the representative game session to see a future interaction, or an operator may 'rewind' the representative game session to review a particular sequence of interactions or events. Additionally, an operator may end the display of the game session, pause the display for a break, or change the size, content, or timing of the display (e.g., go through a sequence of interactions in 'slow motion').

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A gaming system comprising:
a plurality of gaming devices, each gaming device including a game processor configured to record each interaction between a respective player and the gaming device, wherein each recorded interaction is associated with a time stamp and stored in an activity record as part of a session report;
a game server connected to the plurality of gaming devices, the game server including:
a fetcher configured to retrieve a session report from a selected one of the plurality of gaming devices,
a splicer configured to stitch together activity records from the fetched session report, and
a compiler configured to generate a representative gaming session from the stitched activity records;
an analyzer configured to examine multiple session reports compiled from sessions generated by different players and to detect patterns in previously unobserved interactions between the players and the gaming devices;
a terminal connected to the server, the terminal configured to display a playback of the representative gaming session, wherein the terminal includes a control interface to allow manipulation of the playback of the representative gaming session by a terminal operator and a data input device configured to receive inputs from the terminal operator to associate data with the session report; and
a controller configured to alter game parameters on at least one of the plurality of gaming devices based upon instructions received from the terminal operator on the terminal.

2. The gaming system of claim 1, further comprising a database to store fetched session reports and representative gaming sessions.

3. The gaming system of claim 1, wherein the analyzer is further configured to examine predetermined types of game interactions within the session reports in detecting the patterns.

4. The gaming system of claim 3, wherein the predetermined types of game interactions includes award wins over a predetermined value.

5. The gaming system of claim 3, wherein the server further includes a controller configured to alter game parameters on at least one of the plurality of gaming devices based upon the detected patterns.

6. The gaming system of claim 5, wherein the controller is configured to alter game parameters for a gaming device being played by an identified player based on the analyzed behavior of the identified player.

7. The gaming system of claim 1 wherein the interactions include an input from a player to a gaming device.

8. The gaming system of claim 7 wherein the interactions include an output from the gaming device to the player.

9. The gaming system of claim 8 wherein the input includes one of activating a switch and pressing a button.

10. The gaming system of claim 9 wherein the input results in one of choosing a game, selecting game parameters, adjusting a wager, and initiating a game.

11. The gaming system of claim 10 wherein the output includes one of a reel stop and a credit meter change.

12. The gaming system of claim 3, wherein the predetermined types of game interactions include at least one of cash-out interactions and player insertion of additional credits into the gaming device.

* * * * *